3,374,115
STARCH DISPERSIONS
Ernest Frank, Park Forest, and Naoyuki H. Yui, Chicago, Ill., and Anthony A. Silvasi, Hammond, Ind., assignors to American Maize-Products Co., a corporation of Maine
No Drawing. Filed June 24, 1964, Ser. No. 377,524
18 Claims. (Cl. 127—29)

This invention relates to the gelatinization or cooking of starch and more particularly to a method of cooking aqueous starch slurries at elevated temperatures to achieve cooked starch pastes or dispersions having exceptionally uniform viscosities.

The textile and paper industries consume large quantities of modified starch in the form of cooked pastes or dispersions which are used as sizing or coating agents. In such products, the starch granules have been so treated that upon gelatinization and dispersion thereof in water, the viscosity is substantially less than the viscosity of a dispersion of unmodified gelatinized starch. The reduced viscosity is of vital importance to the textile or paper processor and should be capable of variation at will, in a controlled uniform manner and over a fairly broad range, to best meet the processor's normally differing needs.

Dispersions of modified starch have been produced for many years in the art by batch cooking techniques involving careful high temperature treatment of starch slurries in finite quantities. Such processes, by their nature, are wasteful of time and labor and hence the modified starch products almost always bear a premium price. More recently, continuous cooking processes have been devised utilizing instant or so-called "jet" heaters within which a flowing stream of starch slurry is impinged upon by superheated steam and thus substantially instantaneously heated to gelatinization temperature. However, jet cooking gives only a minor degree of reduction in viscosity through mechanical shear of the starch granules and adequate controlled reduction of viscosity cannot be achieved with such techniques.

In accordance with the invention, an entirely new approach has been conceived and proven feasible for manufacturing starch pastes or dispersions which possess exceptionally uniform reduced viscosities, and may be produced commercially in a simple, continuous and reliable manner. In this new method, starch is continuously cooked at elevated temperatures in acid medium and thereby transformed into a starch paste or dispersion of reduced viscosity, and the process is carries out in the presence of salts which in combination comprise strong pH buffer systems, preferably capable of controlling variations in the pH of the slurry being cooked within the limits of plus or minus 0.2 pH unit. It has been found that the use of starches which have been strongly buffered at a given pH, in conjunction with closely controlled variation of other parameters in the cooking process, such as holding time or temperature, can result in virtually any desired reduced viscosity.

While starch has been acid converted heretofore into the depolymerized products such as oligosaccharides, glucose, dextrins, etc., and such conversion processes have utilized acids as catalysts, such products represent very drastic modifications of starch wherein the D.E. (dextrose equivalent) is 15 or substantially higher. The starch pastes or dispersions with which the present invention is concerned are entirely different products, the distinction being that starch in the cooked pastes or dispersions of the invention is merely gelatinized but not substantially deploymerized so that the D.L. is less than 15. As a matter of fact, it has been impossible, though attempts have been made, to achieve cooked starch pastes or dispersions of uniform reduced viscosity when the pH was controlled solely by addition of acid as in the conventional acid conversion processes. For some reason which is not well understood, it has been consistently found that the use of the buffer salt mixture is absolutely necessary for making cooked starch pastes or dispersions having a uniform selected intrinsic viscosity over the range of 0.10 to 1.2 dl./g. (deciliter per gram). It is believed that because reduction of starch paste viscosity in this range is a so much more delicate and critical process than the conventional depolymerization of starch into oligosaccharides, glucose, dextrins, etc., far greater control over the pH is required to achieve the former by means of an acid cooking or dispersing process.

Briefly described, the process of the invention comprises forming an acid-buffered aqueous slurry of starch, that is, a slurry containing salts which in combination form a strong buffer system at any given pH within the range from about 3.0 to about 5.0, then rapidly raising the temperature of the slurry to from about 212° F. to about 375° F. and maintaining the slurry at said temperature for about 2 to about 90 minutes until a cooked starch dispersion of desired viscosity has been formed. In more commercial embodiments of the invention, the aqueous starch slurry is preferably buffered at a pH value within the range from about 3.5 to about 4.5, heated to a temperature from about 250° F. to about 330° F. and maintained at said temperature for about 5 to about 20 minutes.

In forming the buffered aqueous starch slurry, conventional buffer salt systems or combinations, including mixtures of weak acids and salts of the acids formed with strong bases, may be employed. Over the broad pH range of 3.0 to 5.0, specific buffer systems which are useful include phthalic acid combined with monopotassium phthalate, phosphoric acid combined sodium phosphates, acetic acid combined with sodium acetate, citric acid combined with disodium phosphate, alum combined with sodium acetate, alum combined with sodium citrate and similar known combinations. Of course, varying ratios of the components of ony one of these combinations will make the system a useful buffer over a range of pH. For example, a 21 ml. mixture of 0.2 molar disodium phosphate and 0.1 molar citric acid can act as a good buffer at pH 3.0, 4.0 and 5.0 where the relative proportions in the mixture by volume are respectively 20.55% phosphate-79.45% acid, 38.55% phosphate-61.45% acid and 51.50% phosphate-48.50% acid. Generally, combinations of alum and sodium acetate, and alum and sodium citrate, have given excellent results and are preferred. As previously noted, it is also preferred that the chosen buffer system be capable of controlling the expected pH of cooking within plus or minus 0.2 pH unit as can, for example, the alum-citrate system mentioned above.

The buffer may be admixed in advance with the starch which is to be cooked, or the buffer may be added to the aqueous starch slurry. Although the first procedure is more difficult insofar as materials handling and uniformity of mix are concerned, it may be found useful in certain applications and certainly will be effective in achieving the benefits of the invention. On the other hand, addition of the buffer to the aqueous starch slurry which is to be cooked is a simple and more easily controlled technique and therefore is preferred. The buffer materials are in any case added in amounts which will be effective for buffering the quantity of starch slurry to be cooked at the selected pH, and this can be calculated in conventional manner. In general, from about 0.005% to about 0.5% by weight of buffer materials can be added based on the weight of the slurry to be cooked.

Following preparation of the acid-buffered aqueous starch slurry at a pH from about 3.0 to 5.0, the slurry is heated to a temperature from about 212° F. to about 375° F. and maintained at said temperature for about 2 to about 90 minutes to effect the cooking thereof. The elevation of temperature to the levels stated should be accomplished as rapidly as possible to achieve the maximum uniformity of viscosity in the final starch paste. Therefore, while various conventional means or apparatus may be employed, the so-called "jet" or instant heaters previously described are preferred for instantaneously raising the temperature of the buffered starch slurry by the action of live superheated steam (100–150 p.s.i.) thereon. One suitable form of jet heater is available commercially under the trade name "The SK Continuous Heater" from Schutte and Koerting Company of Cornwall Heights, Pa., and others are disclosed in U.S. Patent Nos. 2,940,876 and 3,101,284. These heaters all work on the jet or aspirator principle and when used in the present invention will cause a thin film of the buffered acid-catalyzed aqueous starch slurry to be continuously mixed with superheated steam and thereby substantially instantaneously heated to cooking temperature. As the heating action is practically the same with respect to each individual starch granule, this form of heating means is eminently suited and preferred for carrying out the process of the invention.

The heated slurry should be held under the cooking conditions heretofore described from about 2 to about 90 minutes to achieve the desired reduction in viscosity of the final starch dispersion. For this purpose, the heated slurry may be transferred to hold tanks, which may be heated externally if necessary to maintain the slurry at the required cooking temperatures, and then discharged from the tanks after the holding period has terminated. Where the preferred jet heater is used to continuously heat a continuous stream of the acid buffered slurry, the slurry is also continuously moved through a hold tank in controlled manner so that the residence time of a unit volume of the slurry as it moves through the tank will correspond to the holding period that is required for making a final starch dispersion of a particular reduced viscosity under the selected process conditions of temperature, pH and holding time. In this connection, the hold tank is desirably equipped with conventional liquid level controls which will permit a continuous inflow and outflow at a constant level of liquid in the hold tank so that residence time of a unit liquid volume may, in relation to the total volume of the tank, be accurately controlled.

The process of the invention can be used to form cooked starch dispersions having an intrinsic viscosity of about 0.10 to about 1.2 dl./g., just below the 1.5 dl./g. intrinsic viscosity of dispersed but unmodified starch. These dispersions are exceptionally uniform in quality and, particularly, have sharp, well-defined viscosities which vary very little, if any, from the measured particular value. Thus, the process of the invention provides highly useful and valuable products for the coating and/or sizing of textiles and paper.

In the opinion of the inventors, the following examples constitute the best contemplated modes of carrying out the invention at the present time.

*Example 1*

A slurry of cornstarch in water was adjusted and buffered to pH 3.7 by addition of 0.04% of alum and 0.01% of sodium acetate based on the total weight of the slurry.

The slurry was next substantially instantaneously heated to a temperature of 280° F. by flowing the slurry through a jet heater, sold commercially under the trade name "The SK Continuous Heater" by Schutte and Koerting Company of Cornwall Heights, Pa., and simultaneously injecting 75 p.s.i. steam therein. The slurry was then held at said temperature for 16 minutes following which the resulting cooked starch dispersion was cooled and the intrinsic viscosity of a sample thereof measured. The viscosity was 0.18 dl./g. and could be readily duplicated by use of the conditions described above.

*Example 2*

An aqueous slurry of cornstarch was adjusted and buffered to pH 4.2 by addition of 0.05% of alum and 0.01% of disodium phosphate based on the total weight of the slurry.

Next, the slurry was heated to a temperature of 280° F. in the manner described in Example 1 and held at said temperature for 16 minutes.

The intrinsic viscosity of the resulting starch dispersion was 0.88 dl./g. and again could be readily duplicated.

*Example 3*

An aqueous slurry of starch granules was adjusted and buffered to pH 4.4 by addition of 0.07% of alum and 0.005% of sodium citrate based on the weight of starch slurry.

The acid buffered slurry was heated to a temperature of 270° F. in the manner described in Example 1 and held at said temperature for 16 minutes.

Viscosity determination of the resulting starch dispersion showed that the intrinsic viscosity was 0.85 dl./g. which could be readily duplicated by use of the conditions described above.

*Example 4*

An aqueous starch slurry was adjusted and buffered to pH 5.0 by addition of 0.015% of acetic acid and 0.01% of sodium acetate based on the weight of starch slurry.

After the slurry was heated to 280° F. in the manner described in Example 1 and held at that temperature for 16 minutes, the intrinsic viscosity of the resulting starch dispersion was measured to be 1.2 dl./g. This reduced viscosity could readily be duplicated by use of the conditions described above.

It will be understood that it is intended to cover all changes and modifications of the preferred embodiments of the invention herein chosen for the purpose of illustration which do not constitute departures from the spirit and scope of the invention.

What is claimed is:

1. A method of making cooked starch dispersions of uniform reduced viscosity which comprises forming an aqueous slurry of starch granules, buffering the pH of said slurry to a value within the range from about 3.0 to about 5.0, heating said slurry to a temperature from about 212° F. to 375° F. and maintaining said slurry at the elevated temperature for from about 2 to about 90 minutes until a cooked starch dispersion of desired viscosity has formed.

2. A method in accordance with claim 1 wherein said pH is adjusted to a value within the range from about 3.5 to about 4.5.

3. A method in accordance with claim 1 wherein said slurry is heated to a temperature within the range from about 250° F. to about 330° F.

4. A method in accordance with claim 1 wherein said slurry is maintained at the elevated temperature for from about 5 to about 20 minutes.

5. A method in accordance with claim 1 wherein said slurry is heated to the elevated temperature substantially instantaneously.

6. A method in accordance with claim 1 wherein said buffering is effected by adding to said slurry a mixture of alum and sodium acetate.

7. A method in accordance with claim 1 wherein said buffering is effected by adding to said slurry a mixture of alum and sodium citrate.

8. A method in accordance with claim 1 wherein said buffering is effected by adding to said slurry a mixture of phthalic acid and monopotassium phthalate.

9. A method in accordance with claim 1 wherein said buffering is effected by adding to said slurry a mixture of acetic acid and sodium acetate.

10. A method in accordance with claim 1 wherein said buffering is effected by adding to said slurry a mixture of citric acid and disodium phosphate.

11. A method of making cooked starch dispersions of uniform reduced viscosity which comprises forming an aqueous slurry of starch granules, buffering the pH of said slurry to a value within the range of from about 3.5 to about 4.5, heating said slurry substantially instantaneously to a temperature within the range from about 250° F. to about 330° F. by injecting superheated steam therein, and maintaining said slurry at the elevated temperature for from about 5 to about 20 minutes until a cooked starch dispersion of desired viscosity has formed.

12. A method in accordance with claim 11 carried out continuously.

13. A buffered starch composition adapted to be slurried and cooked in water to form improved starch dispersions of uniform reduced viscosity which comprises particulate starch in admixture with buffer materials in the absence of quantities of water which form a liquid slurry of the admixture, said buffer materials being other than strong mineral acids and being present in an amount effective to provide a slurry pH from about 3.0 to about 5.0 and control of said slurry pH within plus or minus 0.2 pH unit when said admixture is slurried in water, said admixture yielding said improved starch dispersions upon cooking of a slurry of said admixture at a temperature from about 212° F. to about 375° F. for from about 2 to about 90 minutes.

14. A buffered starch composition adapted to be slurried and cooked in water to form improved starch dispersions of uniform reduced viscosity which comprises particulate starch in admixture with a mixture of alum and sodium acetate in the absence of quantities of water which form a liquid slurry of the admixture, said alum and sodium acetate mixture being present in an amount effective to provide a slurry pH from about 3.0 to about 5.0 when said admixture is slurried in water, said admixture yielding said improved starch dispersions upon cooking of a slurry of said admixture at a temperature from about 212° F. to about 375° F. for from about 2 to about 90 minutes.

15. A buffered starch composition adapted to be slurried and cooked in water to form improved starch dispersions of uniform reduced viscosity which comprises particulate starch in admixture with a mixture of alum and sodium citrate in the absence of quantities of water which form a liquid slurry of the admixture, said alum and sodium citrate mixture being present in an amount effective to provide a slurry pH from about 3.0 to about 5.0 when said admixture is slurried in water, said admixture yielding said improved starch dispersions upon cooking of a slurry of said admixture at a temperature from about 212° F. to about 375° F. for from about 2 to about 90 minutes.

16. A buffered starch composition adapted to be slurried and cooked in water to form improved starch dispersions of uniform reduced viscosity which comprises particulate starch in admixture with a mixture of phthalic acid and monopotassium phthalate in the absence of quantities of water which form a liquid slurry of the admixture, said phthalic acid and monopotassium phthalate mixture being present in an amount effective to provide a slurry pH from about 3.0 to about 5.0 when said admixture is slurried in water, said admixture yielding said improved starch dispersions upon cooking of a slurry of said admixture at a temperature from about 212° F. to about 375° F. for from about 2 to about 90 minutes.

17. A buffered starch composition adapted to be slurried and cooked in water to form improved starch dispersions of uniform reduced viscosity which comprises particulate starch in admixture with a mixture of acetic acid and sodium acetate in the absence of quantities of water which form a liquid slurry of the admixture, said acetic acid and sodium acetate mixture being present in an amount effective to provide a slurry pH from about 3.0 to about 5.0 when said admixture is slurried in water, said admixture yielding said improved starch dispersions upon cooking of a slurry of said admixture at a temperature from about 212° F. to about 375° F. for from about 2 to about 90 minutes.

18. A buffered starch composition adapted to be slurried and cooked in water to form improved starch dispersions of uniform reduced viscosity which comprises particulate starch in admixture with a mixture of citric acid and disodium phosphate in the absence of quantities of water which form a liquid slurry of the admixture, said citric acid and disodium phosphate mixture being present in an amount effective to provide a slurry pH from about 3.0 to about 5.0 when said admixture is slurried in water, said admixture yielding said improved starch dispersions upon cooking of a slurry of said admixture at a temperature from about 212° F. to about 375° F. for from about 2 to about 90 minutes.

References Cited

UNITED STATES PATENTS

| | | | |
|---|---|---|---|
| 2,776,228 | 1/1957 | Snyder | 127—67 X |
| 3,097,969 | 7/1963 | Roscelli | 127—71 X |
| 2,779,693 | 1/1957 | Pascu et al. | 127—33 X |
| 2,590,912 | 4/1952 | Yarber | 127—32 |

OTHER REFERENCES

Clark, The Determination of Hydrogen Ions, copyright 1922 by The Williams and Wilkens Co., pp. 99–113 of Chapter IV relied upon.

MORRIS O. WOLK, *Primary Examiner.*

JOSEPH SCOVRONEK, *Examiner.*

E. G. WHITBY, *Assistant Examiner.*